United States Patent [19]

Wolcott et al.

[11] Patent Number: 4,624,839

[45] Date of Patent: Nov. 25, 1986

[54] PROCESS FOR THE RECOVERY OF $CO_2$ FROM FLUE GASES

[75] Inventors: Richard A. Wolcott, Angleton; Roscoe L. Pearce, Lake Jackson, both of Tex.; Charles R. Pauley, Chattanooga, Tenn.

[73] Assignee: The Dow Chemical Company, Midland, Mich.

[21] Appl. No.: 702,961

[22] Filed: Feb. 19, 1985

Related U.S. Application Data

[63] Continuation-in-part of Ser. No. 560,706, Dec. 12, 1983, abandoned.

[51] Int. Cl.$^4$ .............................................. B01D 53/34
[52] U.S. Cl. .................................... 423/228; 423/212; 423/220; 423/229
[58] Field of Search .................. 423/220, 228, 229; 55/68, 73

[56] References Cited

U.S. PATENT DOCUMENTS

| | | | |
|---|---|---|---|
| 1,944,122 | 1/1934 | Fife | 423/229 |
| 2,377,966 | 6/1945 | Reed | 423/229 |
| 2,559,580 | 7/1951 | Alexander | 423/228 |
| 2,797,188 | 6/1957 | Taylor, Jr. et al. | 423/228 |
| 3,568,405 | 3/1971 | Percy | 55/73 |
| 4,287,161 | 9/1981 | Agrawal | 423/229 |
| 4,364,915 | 12/1982 | Proctor | 423/228 |
| 4,477,419 | 10/1984 | Pearce et al. | 423/228 |

Primary Examiner—P. E. Konopka
Attorney, Agent, or Firm—Glwynn R. Baker

[57] ABSTRACT

There is disclosed a procedure for removing copper inhibitor from a circulating fluid which contains the same, which copper may be lost on the cool side of a gas conditioning system by plating out under certain conditions, by contacting a portion of the circulating hot fluid with an activated carbon bed to sorb the copper in excess of the solubility limits within said fluid, regenerating said carbon bed when saturated by contacting said carbon bed with cool circulating fluid, thus returning copper which may have plated out to the circulating fluid in an amount and in an ionic state which will not plate out in the system, the circulating fluid is also treated on the cool side by mechanical filtration, activated carbon sorption and/or ion exchange to remove physical and chemical impurities, contaminates and degradation products.

33 Claims, 4 Drawing Figures

PROCESS FOR THE RECOVERY OF CO₂ FROM FLUE GASES

CROSS REFERENCE TO THE RELATED APPLICATION

This application is a continuation-in-part of Application Ser. No. 560,706 filed Dec. 12, 1983 now abandoned.

BACKGROUND OF THE INVENTION

The supply of carbon dioxide from natural sources, by-product $CO_2$ from ammonia manufacture and hydrogen purification, is not sufficient for the present and future industrial requirements.

The potential supply of $CO_2$ from power plant flue gas or exhaust gas from stationary internal combustion engines could furnish the required amount providing it could be economically recovered. Flue gas normally will be at or near atmospheric pressure and contains about 6-10% $CO_2$ and about 2-5% oxygen. Sulfur dioxide may be an additional contaminant if the fuel source is coal or oil instead of sweet or commercial natural gas.

Most known solvents that can recover $CO_2$ under these conditions will undergo severe solution oxidative degradation and cause corrosion, thus rendering the process uneconomical.

The removal of carbon dioxide from flue gas was practiced in the 1950's and early 1960's by extracting into a solvent the carbon dioxide from the combustion products resulting from burning a fuel. One use of such recovered $CO_2$ was as an inert atmosphere for large annealing furnaces.

The principal solvent used in the removal of $CO_2$ from flue gas during the aforesaid period employed an aqueous monoethanolamine (MEA) solution in the concentration range of 5-12%. The system was operated until oxidative degradation products and corrosion became sufficiently severe as to warrant discarding the solution. The plant was then cleaned and recharged with fresh solution.

Some processes were able to extend the in-service time by operating the dilute MEA solution and passing a small portion of the solution to a side stream reclamation still to remove the contaminants. Such still did remove some of the oxidative degradation products as a bottom product while taking substantially the MEA and water as an overhead product for recycle. The side stream still operated on a 2-3% side stream. This approach was not particularly successful because the degradation products were removed only to a limited extent in the side stream reclaimer. In addition, degradation products continued to be produced at a higher rate than normally found in the process due to the higher temperatures (temperatures above those encountered in the regenerator) necessary for operating the reclaimer still. Removal of the degradation or reaction products also favors shifting the reaction equilibrium for increased reaction rate.

Another mode of operation of the dilute solution process was the utilization of a 5-8% aqueous MEA solution with a 4-8% concentration of sodium carbonate. Sodium carbonate neutralized degradation products that were acidic in nature (formic and oxalic acid are the prime oxidation products in this environment). This mode of operation was somewhat successful but like the other two mentioned systems, was unpredictable in the length of time the system would operate before losing capacity to recover $CO_2$.

All the processes mentioned above were extremely energy intensive due to the extremely high circulation rates necessitated by the low concentration of MEA and the very low loadings of $CO_2$ that were considered necessary in order to minimize corrosion.

Another process described for the recovery of $CO_2$ from a flue gas used a second combustion zone to lower residual oxygen and is described in U.S. Pat. No. 4,364,915 dated Dec. 21, 1982.

A further technique utilized copper salts as an inhibitor and is disclosed in U.S. Pat. No. 2,377,966, dated June 12, 1945. This method was used in the above mentioned systems that did not include the use of a reclaimer in the operation. Copper was only moderately successful as a corrosion inhibitor even at the low $CO_2$ loadings and low concentrations of alkanolamine. Precipitation of elemental copper was a serious limitation of this process and resulted in enhanced corrosion due to galvanic attack in the peripheral area of the deposited copper metal. This system was operated much the same way that the uninhibited aqueous MEA solution first mentioned was utilized, in that when the system became sufficiently degraded the entire solution was dumped, the internals of the plant cleaned, fresh alkanolamine charged back to the system, and the system put back in service. The length of time the system remained on stream was again unpredictable.

The use of activated carbon or ion exchange resin to remove contaminates from aqueous alkanolamine solutions is known from U.S. Pat. Nos. 1,944,122; 2,797,188; 3,568,405; and 4,287,161. However, these patents do not suggest the surprising results obtained using an effective amount of copper salts in the akanolamine solution in conjunction with the use of activated carbon or ion exchange resin as disclosed in copending application Ser. No. 471,626, filed Mar. 3, 1983 entitled IMPROVED PROCESS FOR THE RECOVERY OF CO₂ FROM FLUE GASES by Roscoe Lamont Pearce, Charles Richard Pauley and Richard Alan Woloolt now U.S. Pat. No. 4,477,419.

In accordance with the invention there described, gas containing carbon dioxide and oxygen is contacted in the conventional manner in a suitable gas-liquid contactor with an alkanolamine solution. All of these processes employ an alkanolamine solution containing an amount of copper effective to inhibit corrosion. The actual amount of copper used can be any amount of copper greater than about 5 parts of copper per million parts of solution into which the carbon dioxide and, if present, sulfur containing acid gases (e.g. $SO_2$ with trace amounts of other sulfur compounds, $H_2S$, COS, and the like) are absorbed.

As in any conventional liquid gas absorbent process the effluent (rich solvent) from the contactor is withdrawn from the bottom of the contactor and cross exchanged with solvent (lean solvent) which has been heated to release the absorbed acid gases, in this case to produce a carbon dioxide and sulfur lean solvent. The rich solvent after heat exchange with the lean solvent is delivered to a stripper or regenerator wherein the rich solvent is contacted with rising vapors from the lower end of the stripper. The liquid in the lower end of the stripper is circulated through a reboiler wherein conventionally it is heated to about 240° to 260° F. (115° to 126.5° C.) and returned to the lower portion of the stripper or reboiler surge tank. A portion of the bottoms (now lean solvent) drawn off the stripper or reboiler surge tank is then returned to the absorption column.

The latter identified application described an invention wherein all or a portion of the alkanolamine solution at any temperature, typically passing a cool rich or cool lean solution (convenienty the lean solution after heat exchange with the rich solution from the contactor), sequentially into and through a mechanical filter, a bed of activated carbon, and, a second mechanical filter. Following this treatment, the filtered/carbon treated solution can be passed through an ion exchange resin bed, thence to the top of the contactor.

The above procedure surprisingly effectively removes ionic iron and solvent degradation products. This allows sufficient ionic copper in solution to abate corrosion, minimizes the formation of degradation products, and maintains substantially the efficiency of the alkanolamine solution.

It is to be understood that while the above preferred mode of operation includes the activated carbon treatment, mechanical filtration and ion exchange treatment, some improvement, e.g. lower corrosivity and/or degradative quality of solvent, can be achieved if only one of the unit operations is employed in treating the solvent. Thus, under certain operating conditions, activated carbon treatment can remove certain of the degradation products both by adsorption and/or absorption and its inherent filtering effects mechanically removes some of the particulate material to obtain an improvement when compared to the earlier described processes. It however has been found advantageous to couple mechanical filtration both before and after activated carbon treatment to extend the life of the carbon bed and collect the insoluble iron. Ion exchange treatment may also be employed to remove some of the degradation products, with or without either mechanical filtrations or activated carbon treatment, but the bed must be cleaned more often to avoid plugging with insoluble iron or other solid degradation products when filtration is not employed at least ahead of the exchanger. Here again, mechanical filtration is preferred to keep at a low level the insoluble iron and/or solid degradation products from plugging the bed. Likewise, the use of one or both filtration mediums as the only treatment will improve the operation of the process but not to the same degree as operating on the three unit operations, i.e. mechanical filtration, activated carbon treaLment, and ion exchange.

It has now been discovered that the copper inhibitor lost to plating out and/or when the solution is periodically or continuously, in small aliquots, reclaimed to remove from the solution those degradation and solid products which do form even though at a reduced rate when the process of the copending application is practiced, may be recovered in part and the corrosion (galvanic or stress) can be reduced by practicing the innovations of the present invention.

BRIEF DESCRIPTION OF THE INVENTION

Thus, in accordance with the present invention, it has unexpectedly been found that if a hot lean primary amine gas absorbent solution is passed through a carbon bed, the potential for copper plating out from such solutions in the plant is markedly reduced and that whatever form the copper is in when it is absorbed on the carbon bed it can be recovered from the carbon by passing cool lean absorbent over the carbon. This result is surprising since most skilled in the art recognize the potential for copper in such alkanolamine solutions to plate out and it has been well known that elemental copper can nol be dissolved by primary amines. The copper plating industry has long used primary amines to clean copper plate of the CuO prior to further platings with chromium and the like. Since elemental copper is the culprit in the gas conditioning systems using copper based inhibitors, it is surprising to discover that the copper which has the potential to plate out could be absorbed onto carbon from a hot lean solution and then recovered with a cool lean solution.

Therefore in accordance with the present invention the piping in the prior copending Application Ser. No. 475,626, incorporated in its entirety, is modified to enable the carbon beds to be treated with cool lean absorbent after they become nearly saturated as a result of passing the hot lean absorbent through the bed to remove the copper containing contaminants. Thus, the solvent which has been treated through the carbon bed is returned to the hot lean stream from the stripper and recycled through the process. When the carbon bed nears its saturated capacity, with respect to adsorption of copper (e.g. copper complex) the passage of hot lean solution is stopped and a cool lean stream of solution is passed through the carbon bed and surprisingly the copper complex on the carbon is redissolved into the lean solution. This lean solution may be reintroduced into the lean streams at any point between the stripper lean solution bottoms and the lean solution inlet to the absorber.

Several modifications in piping relative to contacting the carbon bed with cool lean solution to redissolve lhe copper into the solution can be made. The most advantageous manner of carrying out the present invention is to introduce a portion of the hot lean solution from the stripper, into contact with a carbon bed prior to any treatment as described in the copending application, therein reducing the soluble copper in the hot lean solution and delivering the vented solution to a reclaimer. The hot, now substantially copper free, solution can be reclaimed and returned to the process. This scheme may be made without departing from the spirit of the invention. Further another mode comprises employing a filter down stream from the carbon bed. The carbon bed may be operated in a manner that any elemental copper will pass out of the bed (e.g. the bed becomes saturated and solid copper is washed free by the hot solution without redissolution) and be collected on a fiter which, when its filtering capacity is reached, will be switched from the carbon bed to cool lean solution for pickup of the elemental copper in the same manner as aforedescribed with the copper dissolution from the carbon bed.

Details of the process and the several modifications will be described in detail with reference to the accompanying drawings and tables of results hereafter set forth.

BRIEF DESCRIPTION OF THE DRAWINGS

The present invention is illustrated by FIG. 1 which is a schematic diagram of a typical commercial operation showing the association of the conventional contactor 16 with the stripper 74, with the activated carbon bed 48, mechanical filters 42 and 44, and ion exchange bed 34 of U.S. Application Ser. No. 471,626 as modified to incorporate the essence of the present invention.

DETAILED DESCRIPTION OF THE DRAWINGS

Figure 1:
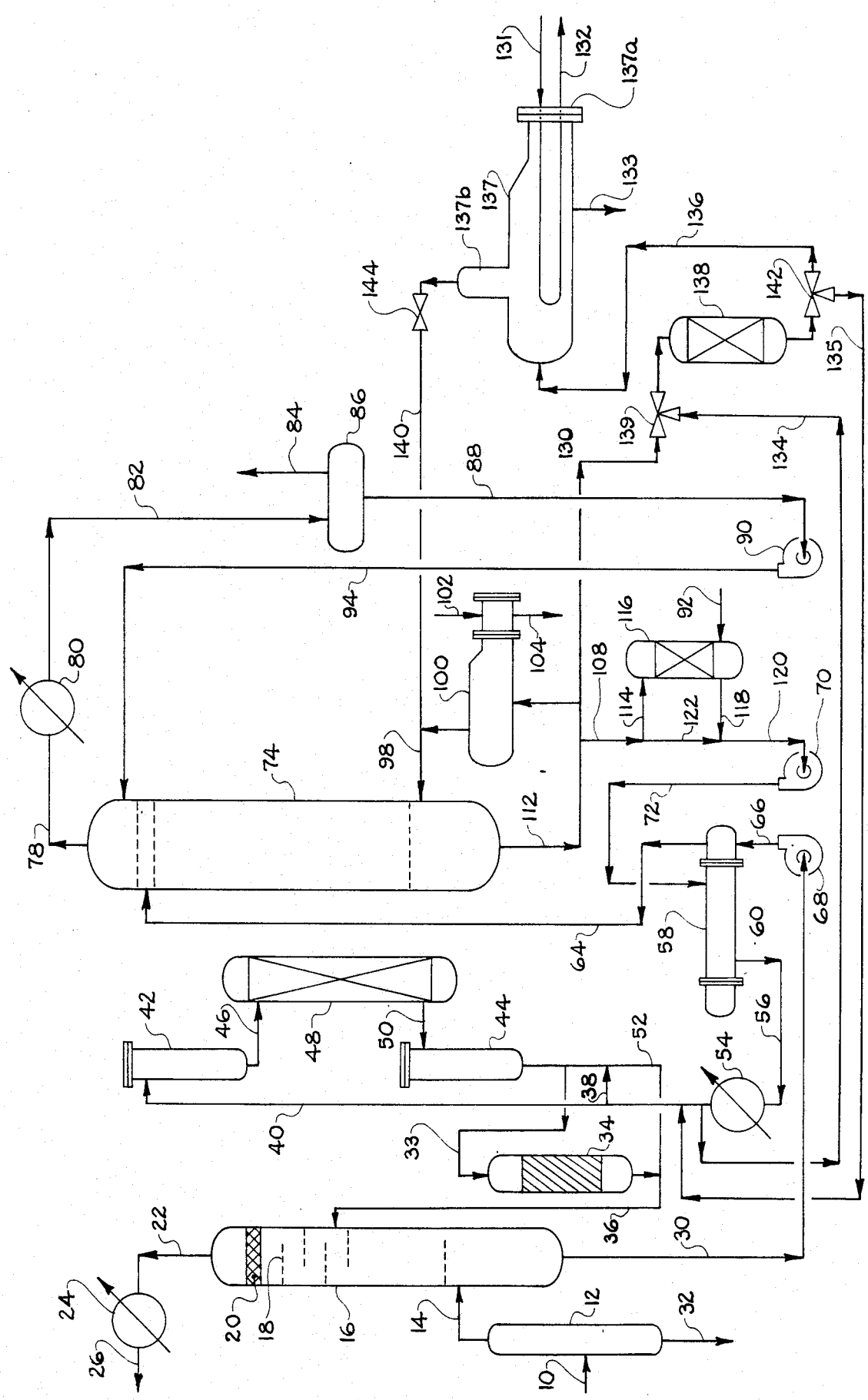

In FIG. 1 of the drawings 10 represents an inlet line for the gas e.g. flue gas to be treated. A knock-out drum 12 with drain line 32 is provided to collect liquid condensates. From the drum 12, line 14 leads the flue gases into absorber 16 which has a plurality of trays 18 and a demister 20.

The effluent gases from the absorber 16 are fed by line 22 optionally to a condensor 24 and to outlet line 26.

Recirculating alkanolamine solution is led by line 36 into the absorber 16 and the rich amine solution i.e., amine containing absorbed $CO_2$, leaves the absorber by exit line 30 and thence to the inlet of pump 68. From the pump outlet 66, the rich amine solution flows through the cross exchanger 58 and via line 64 to the inlet of the stripper 74 wherein the rich amine is heated and stripped of carbon dioxide. The gases containing $CO_2$ are removed through outlet 78 where they flow through a condensor 80 and then by line 82 to a condensate collector 86. The $CO_2$ gas in essence purged free of water is removed by line 84 and the condensate is removed by line 88 and consists of a reflux for reuse by passing it through a pump 90 and ine 94 back to the stripper 74.

At the bottom of the stripper 74, there is provided an outlet line 112 which leads the alkanolamine solution to the inlet of the reboiler 100. The heated solution recirculates back to the stripper by line 98. Steam (here described but other sources of heat may be used) lines 102 and 104 provide an inlet and an outlet for the steam to heat the reboiler 100.

A portion of heated lean alkanolamine solution is withdrawn by line 108 from line 112 and where the solution is recirculated by pump 70 and the associated lines 120, 122 and 72 to the heat exchanger 58. A portion of the lean alkanolamine solution can be withdrawn by line 114 and oxidized with an oxygen containing gas such as air in the oxidizing unit 116. Line 118 is provided to return the oxidized solution back to the main line 120. Oxidizing gases are provided by inlet 92 and the used gases are removed by outlet 115.

From the heat exchanger 58, the alkanolamine solution flows by outlet line 60 to line 56 then to an amine cooler 54 and thence by line 40 to a cartridge filter 42 for removal of fine particulates. From the filter 42 the solution goes by line 46 to an activated carbon bed 48 and thence by line 50 to a second cartridge filter 44 for the removal of carbon fines.

Line 52 is provided to lead the solution back to the absorber by line 36. If desired, part or all of the solution can be passed by line 33 to a ion exchange bed 34 for further purification of the solution prior to reuse. It is to be understood that in the above description the necessary valves and controls have not been illustrated in order to clearly point out the invention. It is also understood that some of the solution may and preferably does by-pass the filtration/purification section through line 38.

The modifications in FIG. 1 which illustrate the present invention are (1) a line 130 connected to the lean solution withdraw line 112 from the stripper 74 to lead the hot lean solution to the inlet of a carbon bed 138 via threeway valve 139 and line 143. A line 136 carries the solution which has contacted the carbon bed through threeway valve 142 and line 136a to the reclaimer 137 which has heating means 137a fed with steam from line 131 and a condensate line 132 to carry away the steam condensate from the reclaimer heat system. The reclaimer has a distillation column 137b through which the water and amine vapors are passed to rectify them for return to the stripper column 74 via valve 144 and line 140 to line 98. Associated with line 130 through valve 139 and line 143 is a line 134 which, when activated by the appropriate valving of valve 139, will provide cool lean solution from the outlet of amine cooler 54 to the carbon bed 138 for recovery, by redissolution, of the copper on the carbon. The outlet line 136 from the carbon bed is connected via threeway valve 142 to line 135 to return the lean solution after redissolution of the copper recovered from the carbon bed to the cold side of exchanger 54. This assembly of associated lines 130, 134, 135, 142 and 143 and thus threeway valves 139 and 142 allow switching of the various streams from one to the other as the carbon bed is first used as a reducing and elemental copper collecting media then as a source of reintroduction of copper into the system via redissolution in cool lean solution.

Figure 2:
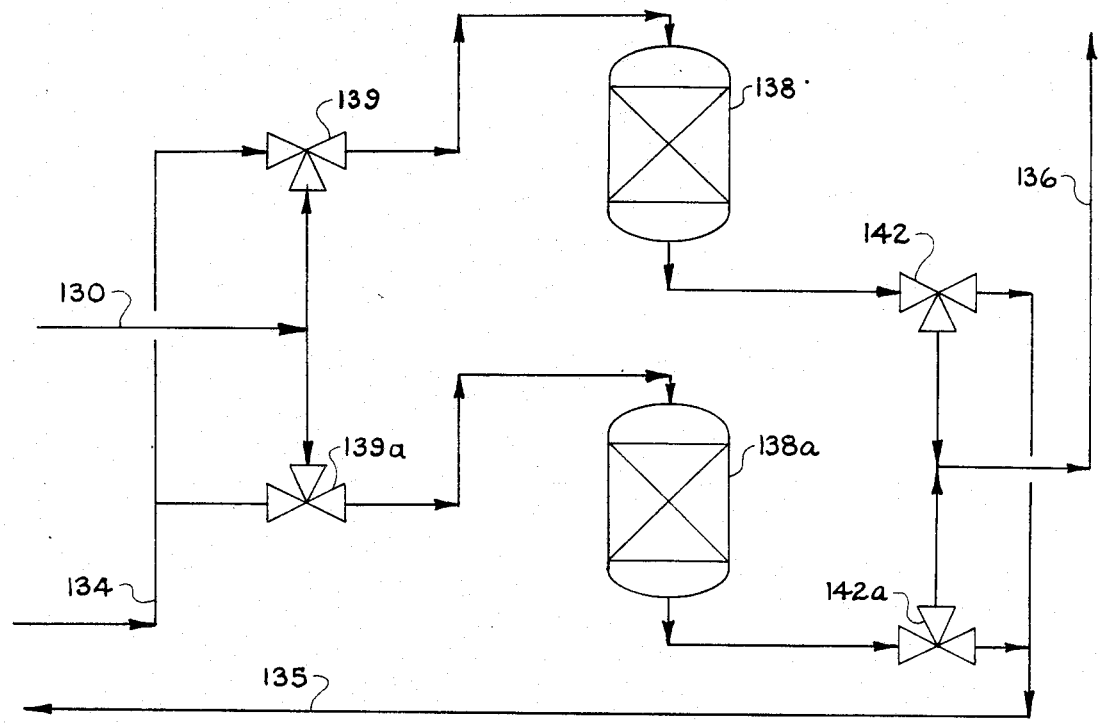
FIGS. 2 and 3 illustrate modifications in the manner of piping the aspect of the present invention to illustrate the flexibiity of the present invention.

FIG. 2 illustrates a variation in the piping so as lo employ two carbon beds 138 and 138a and associated pairs of threeway valves 139, 139a, 142 and 142a, to provide a continuous treatment of hot lean solution in one bed to remove copper while simultaneously recovering copper from the other bed by contact with cool lean solution and thus return the copper to the system.

Figure 3:
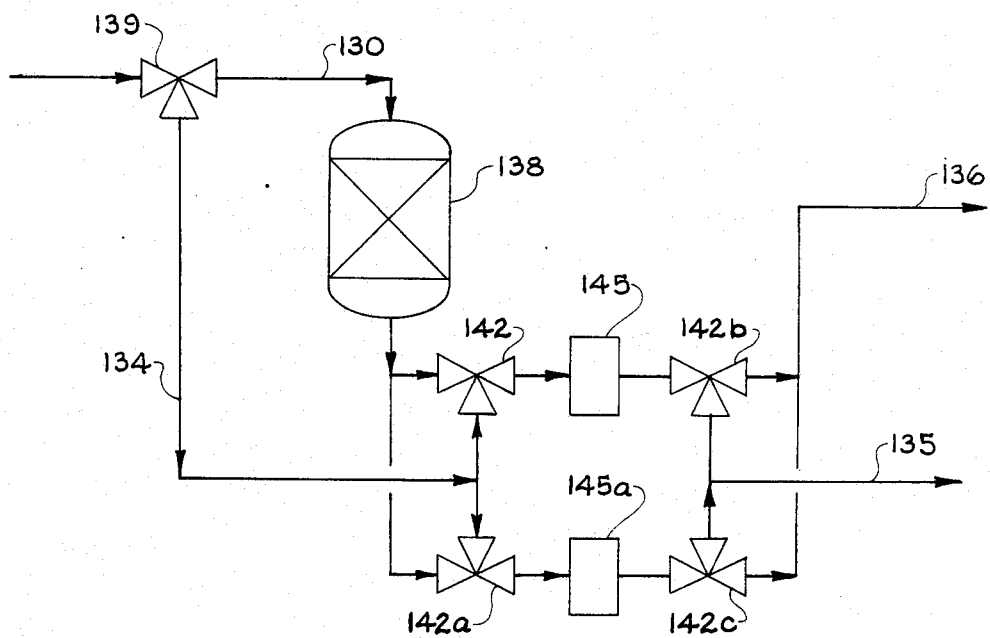

FIG. 3 illustrates the variation whereby the carbon bed is used substantially only for reduction of the copper form in the hot lean solution to a form compatible with collection on a filter, the flow of hot solution carrying with it out of the bed the copper which is collected on a filters 145 or 145a. These latter filters (with associated threeway valves 142, 142a, 142b and 142c)are operated alternately on collection and redissolution in the same manner as the carbon beds in the previous description accompanying FIG. 2. Otherwise the systems operate in the same manner as described with reference to FIG. 1.

Figure 4:
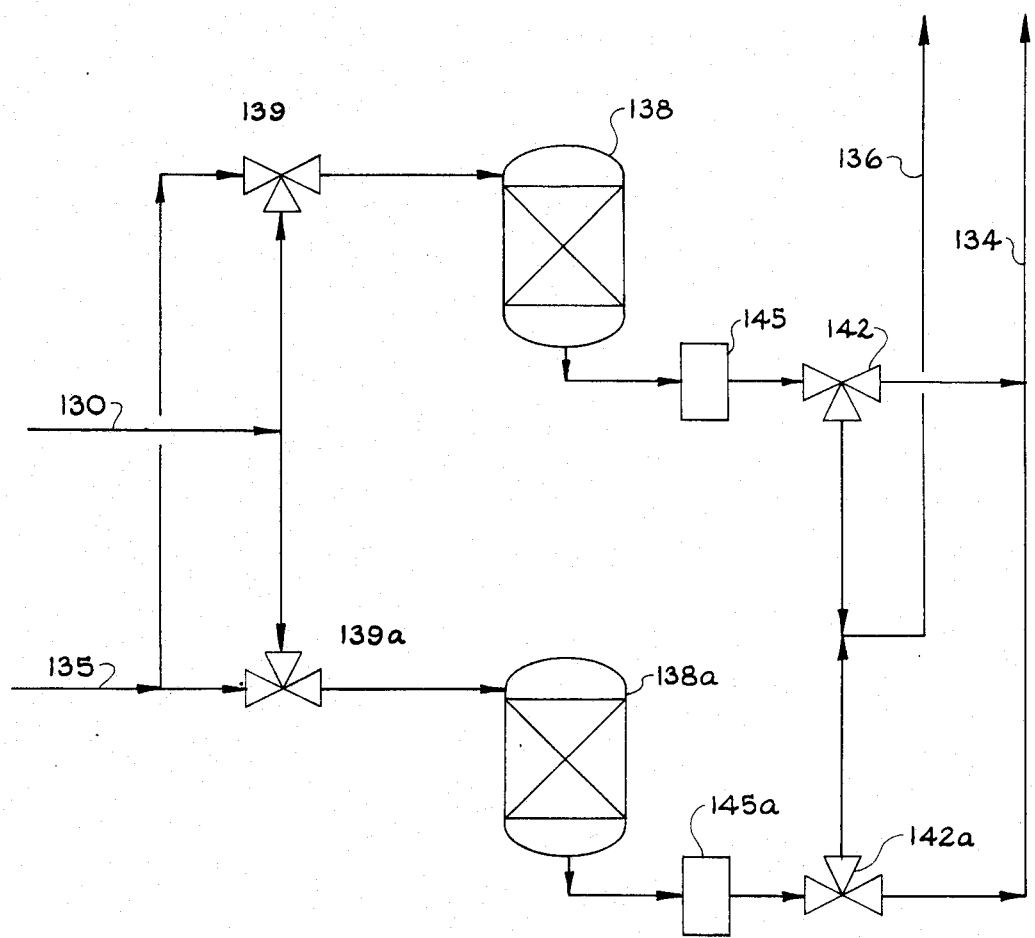
FIG. 4, represents a combination of the treatment illustrated in FIGS. 2 and 3.

FIG. 4 represents a combination of the treatment illustrated in FIGS. 2 and 3.

With a brief description of the unit operations which constitute the present invention, the limits of operating parameters are now set forth.

Inhibitor—The inhibitor of choice for this particular system is ionic copper introduced as any salt soluble in the alkanolamine solution in a concentration greater than about 5 ppm by weight based on the total solution. The preferred soluble salt is copper carbonate. The preferred range is between about 50 ppm and about 750 ppm and the most preferred range is between about 100 ppm and about 500 ppm copper, however it is not implied that greater concentrations of copper are not effective since concentrations in excess of 2000 ppm have been successfully used. It has been shown by both laboratory data and pilot plant data that passivation of the corrosion process can be achieved and maintained even in concentrations less than 50 ppm if the copper is present in the ionic form. Likewise, it has been established that between about 5–80% concentration of MEA can be effectively inhibited against corroding the metal components of the system by maintaining a proper evel of ionic copper in the treating solulion.

Alkanolamine concentration—from about 5 to about 80 percent solutions of alkanolamine may be employed with reduced corrosion and reduced solvent degradation resulting in improved life of solvent, that is, longer periods between turnarounds or unscheduled down times to replace the solvent. Primary, secondary, and tertiary alkanolamines, or mixtures thereof, may be employed. The preferred akanolamine being monoethanol amine of from about 25 to about 50 percent by weight. It has been found from pilot plant data that the incorporation of the present invention results in little or no downtime occasioned by corrosion and/or necessity to replace the solvent for at least periods of two to four years.

Temperature control of the stripper—It has been found that the reduction of active copper ion content, in for example, monoethanolamine, is greatly accelerated above about 150° F. and that reboiler bulk temperatures of from about 240° F. to about 260° F. and above are conducive to excessive reduction of copper particularly increased residence times. It is preferable to maintain the reboiler bulk temperature at or below about 240° F. to about 260° F. Also it is desirable to employ a maximum heat transfer flux of less than about 10,000 BTU and preferably less than about 6,000 BTU per square foot per hour. Higher heat flux and/or residence times will, of course, function but will contribute to a higher rate of copper depletion and thus loss of operability of the overall system.

Temperature Control in the Side Stream Copper Recovery and Reclaimer System—As noted above, the reduction of dissolved copper with hot solution is accelerated a high temperature, e.g. above 150° F. and especially at 240° F. to 260° F. and above. The use of the higher temperatures (240°-260° F. most preferably about 244° to about 250° F.) in the reboiler of the stripper are now advantageous since when contacted with carbon the reduction reaction of copper is accelerated. Thus, it is advantageous to maintain or further heat the portion to be reclaimed to the 240°-260° F. range to facilitate lhe reduction and recovery of the copper before the reclaim side stream is subjected to rectification to recover the amine and water from the higher boiling degradation products and solids produced in the overall system.

Contact Pressure—In accordance with the present invention flue gas will be contacted with the alkanolamine at about atmospheric pressure. However, the invention is applicable to higher pressures, limited only by the condensation pressure of the gas mixture being processed.

Mechanical Filter/Activated Carbon Treater in Cool Lean Solution Recycle Streams—The judicious use of activated carbon coupled with mechanical filtration will remove harmful contaminants resulting from thermal oxidation of akanolamine, auto-oxidation of alkanolamine, and corrosion of the plant equipment. The activated carbon greaters in conjunction with mechanical filters are utilized for the passage of alkanolamine solution through, first, a mechanical filter operating in, for example, the 10-75 micron range, preferably in about the 25-50 micron range for protection of the activated carbon treater which is located immediately downstream. The activated carbon treater will operate to some extent on any of a variety of activated carbons, however it has been found that the most efficient removal for a broad range of degradation products and capacity coupled with longevity of the activated carbon rests with the coal based activated carbons. Allowable bed pressure drop usually determines carbon particle size. A preferred size is in the 12-40 mesh range such as CALGON F-400 or its equivalent.

The carbon treatment removes certain of the degradative products of the alkanolamine which are suspected to be strong iron chelators. Examples of these products are higher molecular weight organic acids. It is reported that these acids are produced from formic acid, generated as a degradation product of the alkanolamines, and oxalic acid which is the further degradation product of formic acid and formates and/or glycine and glycoic acid. The primary function of the mechanical filter down stream of the activated carbon bed is to recover insoluble iron and other particulate material that may be released during the activated carbon function. The pore openings may range from about 1 to about 50 microns with the preferred range being between about 5 to about 25 microns. A secondary function is to colect activated carbon fines thus projecting downstream equipment.

To illustrate the significance of adequate solution fitration, a piot plant was operated with and without filtration while measuring the amount of copper and iron in solution. At temperatures sufficient to strip the solution of $CO_2$ and while the solution was being filtered, the concentration of soluble iron was maintained at low enough concentrations to prevent rapid redox with the copper in solution. When the solution was not filtered or when the filter medium, activated carbon, was spent, the soluble iron concentration increased and the soluble copper concentration rapidly decreased until no copper remained in the solution which was followed by the occurance of corrosion. In the absence of mechanical filtration the carbon itself caught particulate matter and insoluble iron salts which diminished the number of active sites and reduced the overall efficiency of the filtration process. In addition, insoluble iron which was not removed from the system accelerated the rate of soluble iron buildup as the activated carbon began to loose efficiency or become spent. This experiment established the necessity to carbon filter the solution in order to maintain low iron levels and to mechanical filter the solution in order to increase carbon life and minimize the potential for rapid copper redox as the carbon began to lose efficiency.

The solvent stream is activated carbon treated and filtered full flow or as a partial side stream utilizing 0.025 bed volume per minute to 1 bed volume per minute. The preferred rate is 0.1-0.2 bed volume per minute. The present invention likewise has been surprisingly improved by minimizing both activated carbon bed and solvent temperatures to a 150° F. maximum. Operation in this mode improves the capacity and improves the selectivity for particular degradation species. Due to the relatively low temperature requirements for most efficient operation, it is advantageous to place the activated carbon treater and mechanical filters downstream of the amine cooler just prior to introduction of the lean solution to the absorber.

Ion Exchange—Heat stable salts of a number of varieties and from a number of sources are continually produced and/or inadvertently added to alkanolamine systems, especially those processing oxygen containing gas streams. The majority of these salts such as, for example, sodium chloride, amine oxalate, and sodium nitrate are of a type which are not effectively removed by activated carbon and/or mechanical filtration. However, the fact that these salts promote both solvent degradation and inhibitor reduction makes it necessary to remove them from solution. There are two methods of doing this. The known method is solvent reclamation by distillation. This method is not recommended as it depletes the inhibitor level (Cu is not carried over in the distillation process) and unless controlled very carefully can cause increased solvent degradation. The present invention preferably utilizes ion exchange to remove the anionic portion of the heat stable salt. This is accomplished by passage of the contaminated solvent through any of the number of strong base anion exchange resins of the styrenedivinybenzene type which have a quaternary amine as their functional group, i.e. DOWEX* 1, DOWEX* 2, DOWEX* MSA-1, DOWEX* MSA-2 (*Trademark of The Dow Chemical Company). The anions present in solution displace the hydroxide groups present on the resin and are removed from solution. After the resin is spent (its exchange capacity fully utilized) the resin may be discarded or regenerated with a sodium hydroxide solution of essentially any concentration, the preferred concentration being 2–5N. The regeneration effluent, containing the unwanted salts, is then discarded and the resin ready for reuse.

Exemplary of such ion exchange treatment was the treatment of 100 ml. of a foul 30% MEA solution from the plant whioh had 300 ppm copper inhibitor and which was carbon treated. The solution was treated by passing it downflow through a 25 ml packed column of DOWEX 1 ($OH_{31}$ form) at 5 cc/min and 78° F. After discarding the hold-up volume of water, the alkanolamine solution was collected and a sample of both the starting material and resin bed effluent were analyzed for heat stable salt content.

| Sample | % Heat Stable Salt |
| --- | --- |
| Starting Solution | 2.4 |
| Resin Effluent | 1.8 |
| Net one pass removal | 25% |

There was substantially no loss of copper as a result of the ion exchange treatment.

Inhibitor Regeneration—Regeneration of inhibitor is not normally required as long as the conditions taught by this invention are followed specifically. However, if by improper plant design or non-adherance to the conditions set forth herein, copper metal or copper compounds are formed by the reduction of the copper, this inhibitor exhibits the surpising capability of regenerability. There can be provided a sidestream withdrawal of a portion of the solution of the bottom of the reboiler, going through an external cooler to drop the temperature of the hot lean alkanolamine containing particulate matter (which contains the reduced inhibitor) down to a temperature less than 150° F., preferably 130° F. or less, into a tank or suitable vessel as shown in FIG. 1 in which the solution is aerated with an oxygen-containing gas by a variety of means common to those skilled in the art. The lean solution thus cooled and with the inhibitor regenerated it may be returned back to the lean solution downstream of the heat exchanger or any other advantageous spot in the lean circuit.

Employing the concept of the present invention without the oxidizer 116 a side stream of hot lean 30% aqueous amine solution containing 516 ppm copper was diverted from the stripper hot lean solution to a carbon bed. The solution at the outlet of the hot carbon bed analyzed 9.4 ppm copper after four hours on the carbon bed of 30 ml. of CALGON F400 activated carbon and a flow rate of 1.5 cc/min at a bed temperature of 190° F. Cooling the bed with cool lean amine solution and passing the cool lean amine solution through the bed at a rate of 15 cc/min resulted in stripping (redissolving) 100% of the copper from the bed.

We claim:

1. In a process for the recovery of carbon dioxide from feed gases containing the same and oxygen, which may also contain sulfur compounds, by contacting the gas with a circulating alkanolamine solution containing copper as an inhibitor, to absorb the $CO_2$ and thereafter treating said solution rich and $CO_2$ with heat to release the $CO_2$ thereby producing a hot lean solution and returning the so treated lean solution after cooling to the contacting step, the improvement which comprises
   maintaining an amount of copper in said
   circulating solution effective to inhibit corrosion and/or degradation of the solvent
   (a) by contacting all or a portion of said cool lean circulating solution with at least one of the following
      (1) at least one mechanical filter;
      (2) activated carbon bed;
      (3) strong base anion exchange resin; and/or
      (4) any combination thereof; and
   (b) by
      (1) withdrawing a portion of the hot lean solution after the release of the $CO_2$ by heat and, prior to cooling and/or contact with (a)(1), (2) and/or (3), treating said withdrawn hot portion by passing it through a carbon bed independant of (a)(2) to reduce the dissolved ionic cooper in the hot solution;
      (2) stopping said withdrawal of hot lean solution;
      (3) contacting said carbon bed with cool lean solution to redissolve the copper from the carbon bed and returning said copper containing lean cool solution to the absorber.

2. A process of claim 1 wherein the alkanol amine is a monoalkanolamine.

3. A process of claim 1 wherein the alkanol amine is monoethanolamine.

4. The process of claim 1 wherein a portion of the circulating solution is withdrawn and blown with an oxygen containing gas and said portion is returned to the alkanolamine circuit.

5. The process of claim 1 wherein the maximum bulk temperature of the heated alkanolamine is no greater than about 260° F. and is subjected to a heat flux of less than about 10,000 $BTU/ft^2/hr$.

6. The process of claim 1 wherein the bulk temperature of the heated alkanolamine is about 244° to about 250° F. and is subJected to a heat flux of less than about 6000 $BTU/ft^2/hr$.

7. The process of claim 1 wherein the copper ion is maintained at between about 50 ppm and about 750 ppm.

8. The process of claim 1 wherein the copper ion is maintained at between about 100 ppm and about 500 ppm.

9. The process of claim 1 wherein the cool circulating solution is subJected to treatment by contact with an activated carbon treater thereby to remove one or more of the soluble iron, insoluble iron and solvent degradation products.

10. The process of claim 1 wherein the circulating solution is subjected to treatment by contact with a mechanical filter thereby to remove one or more of the insoluble iron and solvent degradation products.

11. The process of claim 1 wherein the circulating solution is subjected to treatment by contact with a strong base anion exchange resin thereby to remove one or more of the soluble iron, insoluble iron and solvent degradation products.

12. The process of claim 1 wherein the circulating solution is subjected to treatment by contact with a mechanical filter and an activated carbon treater thereby to remove one or more of the soluble iron, insoluble iron and solvent degradation products.

13. The process of claim 1 wherein the circulating solution is subjected to treatment by contact with a mechanical filter and a strong base anion exchange resin thereby to remove one or more of the soluble iron, insoluble iron and solvent degradation products.

14. The process of claim 1 wherein the cool circulating solution is subjected to treatment by contact with a mechanical filter followed by an activated carbon treater, a second mechanical filter and a strong base anion exchange resin thereby to remove one or more of the soluble iron, insoluble iron and solvent degradation products.

15. The process of claim 1 wherein the feed gas is a flue gas.

16. The process of claim 1 wherein the feed gas is a gas from an internal combustion engine.

17. In a process for the recovery of carbon dioxide from feed gases containing the same and oxygen, which may also contain sulfur compounds, by contacting the gas with a circulating alkanolamine solution, containing copper as an inhibitor, and treating said solution rich in $CO_2$ with heat to release the $CO_2$ thereby thereby producing a lean solution and returning the so treated lean solution, after cooling, to the contacting step, the improvement which comprises maintaining at least 5 parts of copper per million parts solution in said circulating solution;
(a) by contacting all or a portion of said cool lean circulating solution with at least one of the following
 (1) at least one mechanical filter;
 (2) activated carbon bed;
 (3) strong base anion exchange resin; and/or
 (4) any combination thereof; and
(b) by
 (1) withdrawing a portion of the hot lean solution after the release of the $CO_2$ by heat and, prior to cooling and/or contact with (a)(1), (2) and/or (3), treating said withdrawn hot portion by passing it through a carbon bed independant of (a)(2) to reduce the dissolved ionic copper in the hot solution;
 (2) stopping said withdrawal of hot lean solution;
 (3) contacting said carbon bed with cool lean solution to redissolve the copper from the carbon bed and returning said copper containing lean cool solution to the absorber.

18. A process of claim 17 wherein the alkanolamine is a monoalkanolamine.

19. A process of claim 17 wherein the alkanolamine is monoethanolamine.

20. The process of claim 17 wherein a portion of the circulating solution is withdrawn and blown with an oxygen containing gas and such so-treated stream is returned to the alkanolamine circuit.

21. The process of claim 17 wherein the maximum bulk temperature of the heated alkanolamine is no greater than about 260° F. and is subjected to a heat flux of less than about 10,000 $BTU/ft^2/hr$.

22. The process of claim 17 wherein the bulk temperature of the heated alkanolamine is about 244° to about 250° F. and is subjected to a heat flux of less than about 6000 $BTU/ft^2/hr$.

23. The process of claim 17 wherein the copper ion is maintained at between about 50 ppm and 750 ppm.

24. The process of claim 17 wherein the copper ion is maintained at between about 100 ppm and 500 ppm.

25. The process of claim 17 wherein the cool circulating solution is subjected to treatment by contact with an activated carbon treater thereby to remove one or more of the soluble iron, insoluble iron and solvent degradation products.

26. The process of claim 17 wherein the circulating solution is subjected to treatment by contact with a mechanical filter thereby to remove one or more of the insoluble iron and solvent degradation products.

27. The process of claim 17 wherein the circulating solution is subjected to treatment by contact with a strong base anion exchange bed thereby to remove one or more of the soluble iron, insoluble iron and solvent degradation products.

28. The process of claim 17 wherein the circulating solution is subjected to treatment by contact with a mechanical filter and an activated carbon treater thereby to remove one or more of the soluble iron, insoluble iron and solvent degradation products.

29. The process of claim 17 wherein the circulating solution is subjected to treatment by contact with a mechanical filter and a strong base anion exchange bed thereby to remove one or more of the soluble iron, insoluble iron and solvent degradation products.

30. The process of claim 17 wherein the cool circulating solution is subected to treatment by contact with a mechanical filter followed by an activated carbon treater, a second mechanical filter and a strong base anion exchange resin thereby to remove one or more of the soluble iron, insoluble iron and solvent degradation products.

31. The process of claim 17 wherein the feed as is a flue gas.

32. The process of claim 17 wherein the feed gas is a gas from an internal combustion engine.

33. In a process for the recovery of carbon dioxide from feed gases containing the same and oxygen, which may also contain sulfur compounds, by contacting the gas with a circulating liquid aqueous 5 to 80% by weight alkanolamine solution, containing copper as an inhibitor and treating said solution rich in $CO_2$ with heat to release the $CO_2$ thereby producing a hot lean solution and returning the so treated lean solution, after cooling, to the contacting step, the improvement which comprises maintaining at least 5 parts of copper per million parts solution in said circulating solution;
(a) by contacting all or a portion of said cool lean circulating solution with at least one of the following
 (1) at least one mechanical filter;
 (2) activated carbon bed;
 (3) strong base anion exchange resin: and/or
 (4) any combination thereof; and (b) by
(1) withdrawing a portion of the hot lean solution after the release of the $CO_2$ by heat and, prior to cooling and/or contact with (a)(1), (2) and/or (3), treating said withdrawn hot portion by passing it through a carbon bed independant of (a)(2) to reduce the dissolved ionic copper in the hot solution;
(2) stopping said withdrawal of hot lean solution;
(3) contacting said carbon bed with cool lean solution to redissolve the copper from the carbon bed and returnning said copper containing lean cool solution to the absorber.

* * * * *